United States Patent Office 2,971,028
Patented Feb. 7, 1961

2,971,028
2-FLUORO OXIMES

Don N. Gray, Boulder, Colo., assignor to The Dow Chemical Company, Midland, Mich., a corporation of Delaware No Drawing. Filed Dec. 11, 1958, Ser. No. 779,533

2 Claims. (Cl. 260—566)

The present invention relates to aliphatic 2-fluoro oximes, and to a method for their preparation. The new compounds are characterized by the formula

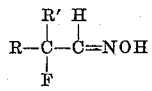

wherein R and R' represent members selected from the group consisting of hydrogen and lower alkyl radicals containing from 1 to 3 carbon atoms, inclusive. These compounds have been found useful as systemic insecticides and as intermediates for the preparation of 2-fluoroaldehydes, 2-fluoroacids, 2-fluoroamines, and the like.

The compounds of the present invention may be conveniently prepared by reacting, in the presence of a solvent, 2-chloro aliphatic aldehyde oxime having the formula:

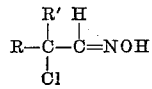

wherein R and R' have the hereinbefore assigned values, with a metal fluoride salt of the metals of groups I and II of the periodic chart of the elements. Reaction takes place smoothly at temperatures of from about 30° C. to about 100° C., and is usually carried out at the reflux temperature of the reaction mixture. Solvents which are suitable are organic liquids which are inert to the reactants and reaction products, such as, for example, methyl alcohol, ethyl alcohol, propyl alcohol, methylene chloride, chloroform, carbon tetrachloride, petroleum ether, benzene, and the like. Good results are obtained when employing one or more molar equivalents of metallic fluoridesalt for each molar equivalent of 2-chloro oxime. Mole ratios of metal fluoride to 2-chloro oxime of less than 1:1 will result in lower yields of products, based on 2-chloro oxime starting material.

Oxime starting materials which are suitable include, for example, 2-chloro-2-methylpropionaldehyde oxime; chloroacetaldehyde oxime; 2 - chloropropionaldehyde oxime; 2-chlorobutyraldehyde oxime, and the like. Metallic fluoride salts of groups I and II which are suitable include, for example, potassium fluoride, lithium fluoride, sodium fluoride, rubidium fluoride, magnesium fluoride, calcium fluoride, strontium fluoride, barium fluoride, copper fluoride, zinc fluoride, silver fluoride, cadmium fluoride, mercury fluoride, mixtures thereof, and the like. The reaction is usually carried out at atmospheric pressure, although higher or lower pressures may be used, if desired. A reaction time of from about 1 to about 24 hours, preferably from about 2 to about 16 hours, is usual.

The present invention may be further illustrated by the following Example, but is not to be construed as limited thereto:

*Example.—2-fluoro-2-methyl propionaldehyde oxime*

A charge of 12.16 grams (0.16 mole) of 2-chloro-2-methylpropionaldehyde oxime is dissolved in 150 milliliters of methyl alcohol and 11.6 grams (0.2 mole) of anhydrous potassium fluoride added. The mixture is stirred and heated at reflux for 24 hours. The solvent is then removed by distillation and the solid mass extracted several times with hot petroleum ether (30–60° C.). The combined extracts are then evaporated and the resulting product sublimed to yield large needles of white solid material, having a melting point of 41.5 to 42.0° C.

In a manner similar to the foregoing example, other 2-fluoro oximes may be prepared, such as, for example: fluoroacetaldehyde oxime, by reacting chloroacetaldehyde oxime with sodium fluoride; 2-fluoropropionaldehyde oxime, by reacting 2-chloropropionaldehyde with magnesium fluoride; 2-fluorobutyraldehyde oxime, by reacting 2-chlorobutyraldehyde oxime with zinc fluoride; 2-fluorovaleraldehyde oxime, by reacting 2-chlorovaleraldehyde oxime with mercury fluoride; 2-fluoro-3-methylvaleraldehyde oxime, by reacting 2 - chloro - 3-methylvaleraldehyde oxime with barium fluoride; 2-fluoro-2-methylbutyraldehyde oxime, by reacting 2-chloro-2-methylbutyraldehyde oxime with calcium fluoride; 2-fluoro-3-methylbutyraldehyde oxime, by reacting 2-chloro-3-methylbutyraldehyde oxime with lithium fluoride; 2-fluoro-2-ethylbutyraldehyde oxime, by reacting 2-chloro-2- ethylbutyraldehyde oxime with sodium fluoride; 2-fluoro-2-ethylvaleraldehyde oxime, by reacting 2-chloro-2-ethylvaleraldehyde oxime with potassium fluoride; 2-fluoro-2-propylvaleraldehyde oxime, by reacting 2-chloro-2-propylvaleraldehyde oxime with cadmium fluoride; and the like.

Thus, the compounds of the present invention are 2-fluoroaldehyde oximes containing from 2 to 8 carbon atoms inclusive. The new 2-fluoro oximes are effective as systemic insecticides. For such use, the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of ail-in-water emulsions or water dispersions with or without the addition of wetting, dispersing or emulsifying agents. In representative operations, foliar applications of aqueous spray compositions containing 25 parts of 2-fluoro-2-methylpropionaldehyde oxime per million parts of ultimate mixture have been found to give substantially complete control of bean aphid (*Aphis fabae*). Parallel exposure of a control group of bean aphids to the inert diluent itself resulted in no control.

Various modifications may be made in the present invention without departing from the spirit or scope thereof, and it is understood that I limit myself only as defined in the appended claims.

I claim:
1. A compound having the formula

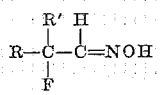

wherein R and R' represent members selected from the group consisting of hydrogen and lower alkyl radicals containing up to 3 carbon atoms, inclusive.

2. 2-fluoro-2-methylpropionaldehyde oxime.

References Cited in the file of this patent

Meister: Ber. Deut. Chem., vol. 40, 1907, page 3442.
Drew et al.: J. Chem. Soc. (London), vol. of 1934, pages 49–50.
Adams et al.: "Organic Reactions," vol. 2, 1944, page 51.